United States Patent
Chandrasekharan et al.

(10) Patent No.: US 7,958,487 B2
(45) Date of Patent: Jun. 7, 2011

(54) APPARATUS, SYSTEM, AND METHOD FOR MODIFYING AN INTEGRATION SOFTWARE TEMPLATE

(75) Inventors: Sivakumar Chandrasekharan, Alameda, CA (US); Yury Kosov, San Francisco, CA (US); Zhengyuan Qiao, Burlingame, CA (US)

(73) Assignee: International Business Machines Corporation, Armonk, NY (US)

(*) Notice: Subject to any disclaimer, the term of this patent is extended or adjusted under 35 U.S.C. 154(b) by 1088 days.

(21) Appl. No.: 11/385,495

(22) Filed: Mar. 21, 2006

(65) Prior Publication Data
US 2007/0226244 A1 Sep. 27, 2007

(51) Int. Cl.
*G06F 9/44* (2006.01)
(52) U.S. Cl. ........................... 717/106; 717/110
(58) Field of Classification Search .................. 717/106
See application file for complete search history.

(56) References Cited

U.S. PATENT DOCUMENTS

| | | | |
|---|---|---|---|
| 5,675,804 A | 10/1997 | Sidik et al. | 395/705 |
| 5,754,858 A * | 5/1998 | Broman et al. | 717/111 |
| 6,496,833 B1 | 12/2002 | Goldberg et al. | 707/102 |
| 7,168,035 B1 * | 1/2007 | Bell et al. | 715/234 |
| 7,281,018 B1 * | 10/2007 | Begun et al. | 707/102 |
| 7,406,474 B2 * | 7/2008 | Musteata et al. | 1/1 |
| 7,500,178 B1 * | 3/2009 | O'Donnell | 715/221 |
| 7,536,686 B2 * | 5/2009 | Tan et al. | 717/174 |
| 2002/0116454 A1 | 8/2002 | Dyla et al. | 709/203 |
| 2003/0093404 A1 * | 5/2003 | Bader et al. | 707/1 |
| 2003/0097296 A1 * | 5/2003 | Putt | 705/11 |
| 2003/0182353 A1 * | 9/2003 | Flanigan et al. | 709/104 |
| 2003/0196167 A1 | 10/2003 | Dewar | 715/507 |
| 2003/0229482 A1 * | 12/2003 | Cook et al. | 703/14 |
| 2003/0236576 A1 * | 12/2003 | Resnick et al. | 700/9 |
| 2004/0192277 A1 * | 9/2004 | Pakarinen et al. | 455/418 |
| 2004/0205412 A1 * | 10/2004 | Staron et al. | 714/38 |
| 2004/0268186 A1 * | 12/2004 | Maturana et al. | 714/38 |
| 2005/0027582 A1 * | 2/2005 | Chereau et al. | 705/9 |
| 2005/0102500 A1 * | 5/2005 | Khangaonkar et al. | 713/153 |
| 2005/0114394 A1 * | 5/2005 | Kaipa et al. | 707/104.1 |
| 2005/0149941 A1 * | 7/2005 | Watson et al. | 719/310 |
| 2005/0257193 A1 * | 11/2005 | Falk et al. | 717/109 |
| 2006/0101458 A1 * | 5/2006 | Saad et al. | 717/174 |
| 2006/0130047 A1 * | 6/2006 | Burugapalli | 717/170 |
| 2006/0230048 A1 * | 10/2006 | Kosov et al. | 707/100 |
| 2007/0234263 A1 * | 10/2007 | Cox et al. | 716/11 |

OTHER PUBLICATIONS

IBM Corporation, Running an ODA, 2004, (ODA.pdf), pp. 7.*
"ETI Solution Version 5.2," Bloor Research Report, vol. 1, 2004.

* cited by examiner

*Primary Examiner* — Emerson C Puente
*Assistant Examiner* — Hiren Patel
(74) *Attorney, Agent, or Firm* — Kunzler Needham Massey & Thorpe

(57) ABSTRACT

An apparatus, system, and method are disclosed for modifying an integration software template. In one embodiment, a developer selects a template that employs a first code set from a library. A development module creates a project from a template using a developer input. A template modification module modifies the template in response to the project. A code generation module generates a second code set from the project. In one embodiment, an export module exports the second code set to the library.

32 Claims, 11 Drawing Sheets

800

```
<snp:codeUnit snp:id="_0" xmlns:snp="http://www.ibm.com/websphere/
AdapterToolkit/CodeUnit">
  <snp:call-template snp:type="AdapterAgent" snp:id="_1">
    <snp:with-param snp:name="packageName" snp:type="String" snp:id="_1">
      <snp:value>${Package_Name}</snp:value>
    </snp:with-param>
    <snp:with-param snp:name="target" snp:type="String[]" snp:id="_2">
      <snp:value>${Target_Name}</snp:value>
    </snp:with-param>
  </snp:call-template>
</snp:codeUnit>
```

815a — `snp:id="_1"` (call-template)
815b — `snp:id="_2"`
810a — `${Package_Name}`
810b — `${Target_Name}`
805 — entire code unit block

```
<snp:codeUnit snp:id="_0" xmlns:snp="http://www.ibm.com/websphere/
AdapterToolkit/CodeUnit">
<snp:call-template snp:type="AdapterAgent" snp:id="_1">                    ⎫
<snp:with-param snp:name="packageName" snp:type="String" snp:id="_1">      ⎪  815a
<snp:value>${Package_Name}</snp:value>   810a                              ⎪
</snp:with-param>                                                          ⎬  1005
 <snp:with-param snp:name="target" snp:id="_2">                            ⎪
<snp:value>${"SAP"}</snp:value>   1010       815b                          ⎪
</snp:with-param>                                                          ⎪
 </snp:call-template>                                                      ⎭
</snp:codeUnit>
```

FIG. 10

APPARATUS, SYSTEM, AND METHOD FOR MODIFYING AN INTEGRATION SOFTWARE TEMPLATE

BACKGROUND OF THE INVENTION

1. Field of the Invention

This invention relates to modifying tools and more particularly relates to modifying an interface software template.

2. Description of the Related Art

A hub server is often used to provide computing resources to a plurality of enterprise applications including web-based applications. For example, a hub server may be employed to host a web-based order management application, a data base application, and the like. The computing resources may include database resources, data storage resources, processing resources, and the like.

The hub server may integrate one or more applications on a common platform or across disparate platforms. The integration of the applications may allow the applications to share data, enhancing the usefulness of all applications. In integrating the applications, the hub server may provide the computing resources for applications that are written specifically to interface with the hub server. For example, a transaction processing application may be written specifically to interface with a specified hub server. In addition, the hub server may provide can computing resources for applications that are not written to interface with the hub server. For example, the hub server may provide computing resources to an inventory management system that was written for use with a stand-alone inventory database.

In one embodiment, the hub server organizes computing resources as objects. The objects are referred to herein as business objects. Business objects are objects specifically designed to satisfy needs of one or more business processes. Business objects may comprise transactions or events including one or more functions and employing elements in a data structure, elements of a database schema, or the like. For example, a business object may include business object may include a function to search a database column for a specified identifier, and a function to retrieve a data value from the row of the identifier.

The business objects of the hub server may be named and organized differently from analogous objects of the applications interfacing with the hub server. In addition, business objects may be generic and used to interface with a plurality of applications. For example, a transaction processing application, a financial application, and an inventory management application may each use a generic finished goods inventory business object. The generic finished goods inventory object may include functions that sum data values in a database column.

The hub server may employ an adapter agent to interface with an application. Adapter agents provide prepackaged connectivity that integrates disparate industry-specific and cross-industry computing systems by pulling and uniting information from packaged and custom applications; mainframe systems; technology protocols; databases; and trading partners. The adapter agent may convert generic hub server business objects into objects employed by an application, referred to herein as application objects. Similarly, the adapter agent may convert an application object into a generic business object for use by the hub server. For example, the adapter agent may convert an object that retrieves a finished goods inventory sum value into the generic finished goods business object described above.

The hub server may employ an object discovery agent ("ODA") to discover the application objects associated with an application. In addition, the ODA may generate a generic business object that is compatible with a discovered application data object. For example, the ODA may communicate with an application to discover the application objects employed by the application. The ODA may further generate equivalent generic business objects, mapping hub server functions and data to the application object functions and data. Thus the ODA may create the business object/application object relationships that allow the adapter agent to interface between the hub server and the application.

Tools have been developed to automate the creation of an ODA and/or an adapter adapter agent. For example, a user may employ an adapter template to create an adapter agent that interfaces a hub server and an application. Tools reduce the time and cost of creating an ODA and/or adapter agent.

Unfortunately, the user may repeatedly make one or more similar customizing entries while using the tools to create a succession of ODAs and/or adapter agents for a particular hub server. For example, the user may repeatedly enter a plurality of customizing entries specific to an application based on software produced by SAP AG of Walldorf, Germany. Although the tools may allow the user to create the ODAs and/or adapter agents more rapidly with fewer coding errors, the tools still do not automate many of the important customizing functions.

From the foregoing discussion, it should be apparent that a need exists for an apparatus, system, and method that modify an interface creation tool. Beneficially, such an apparatus, system, and method would reduce the time and cost of creating an ODA and adapter agent by incorporating common customizing entries into the tool.

SUMMARY OF THE INVENTION

The present invention has been developed in response to the present state of the art, and in particular, in response to the problems and needs in the art that have not yet been fully solved by currently available integration software template modification methods. Accordingly, the present invention has been developed to provide an apparatus, system, and method for modifying an integration software template that overcome many or all of the above-discussed shortcomings in the art.

The apparatus to modify an integration software template is provided with a plurality of modules configured to functionally execute the steps of creating a project, modifying a template comprising a first code set, and generating a second code set. These modules in the described embodiments include a library, development module, a template modification module, and a code generation module.

The library includes a first code set. In one embodiment, the first code set is an extensible markup language ("XML") code set. The library also includes an integration software template. As used herein, the integration software template may be referred to as a template. The template may be an XML form. In a certain embodiment, the first XML code set generates the XML form template. The library may include a plurality of code sets and templates.

The development module creates a project from the template and a developer input. In one embodiment, the template is an adapter template for generating an adapter agent for interfacing between a hub server and an application. In an alternate embodiment, the template is an ODA template for generating an ODA that specifies a business object from interactions with the application.

The template modification module modifies the template in response to the project. In one embodiment, the template modification module modifies the template by incorporating the developer input into the template. In an alternate embodiment, the template modification module modifies the template by making the developer input available as a selectable template option.

The code generation module generates a second code set from the modified template. In one embodiment, the second code set is an XML code set. The second code set may be employed by the template to receive developer inputs. Alternatively, the second code set may generate a modified template. The apparatus modifies the template by generating and employing the second code set, allowing a developer to retain and reuse modifications.

A system of the present invention is also presented to modify an integration software template. The system may be embodied in an integration software system. In particular, the system, in one embodiment, includes a library and a development suite. The development suite includes a development module, a template modification module, a code generation module, and an export module.

The library includes a plurality of XML code sets and one or more templates that employ the code sets. The templates may be generated from the XML code sets. The development module creates a project from a first template employing a first XML code set using a developer input. The template modification module modifies the first template in response to the project. The code generation module generates a second XML code set from the project. The export module may export the second XML code set to the library. The second XML code set in the library is employable by a second template.

In one embodiment, generating the second XML code set comprises replacing an input prompt of the first XML code set with a specified parameter. The first template may be an ODA template for an ODA that specifies a business object from interactions with an application. Alternatively, the first template may be an adapter template that specifies an adapter agent for interfacing between a hub server and an application. The system modifies the first template, generating the second XML code set that is reused to develop integration software via the second template.

A method of the present invention is also presented for modifying an integration integration software template. The method in the disclosed embodiments substantially includes the steps to carry out the functions presented above with respect to the operation of the described apparatus and system. In one embodiment, the method includes creating a project, modifying a template comprising a first code set, and generating a second code set.

In one embodiment, a developer selects a template that employs a first code set from a library. A development module creates a project from a template using a developer input. A template modification module modifies the template in response to the project. A code generation module generates a second code set from the project. In one embodiment, an export module exports the second code set to the library. The method modifies the template to preserve the developer input for future projects.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention modifies an integration software template. In addition, the embodiment of the present invention may export a second code set that includes the template modifications to a library to allow subsequent reuse of the modifications. modifications. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is a text diagram illustrating one embodiment of a code set of the present invention;

FIG. 10 is a text diagram illustrating one embodiment of a modified code set of the present invention.

DETAILED DESCRIPTION OF THE INVENTION

Figure 1:
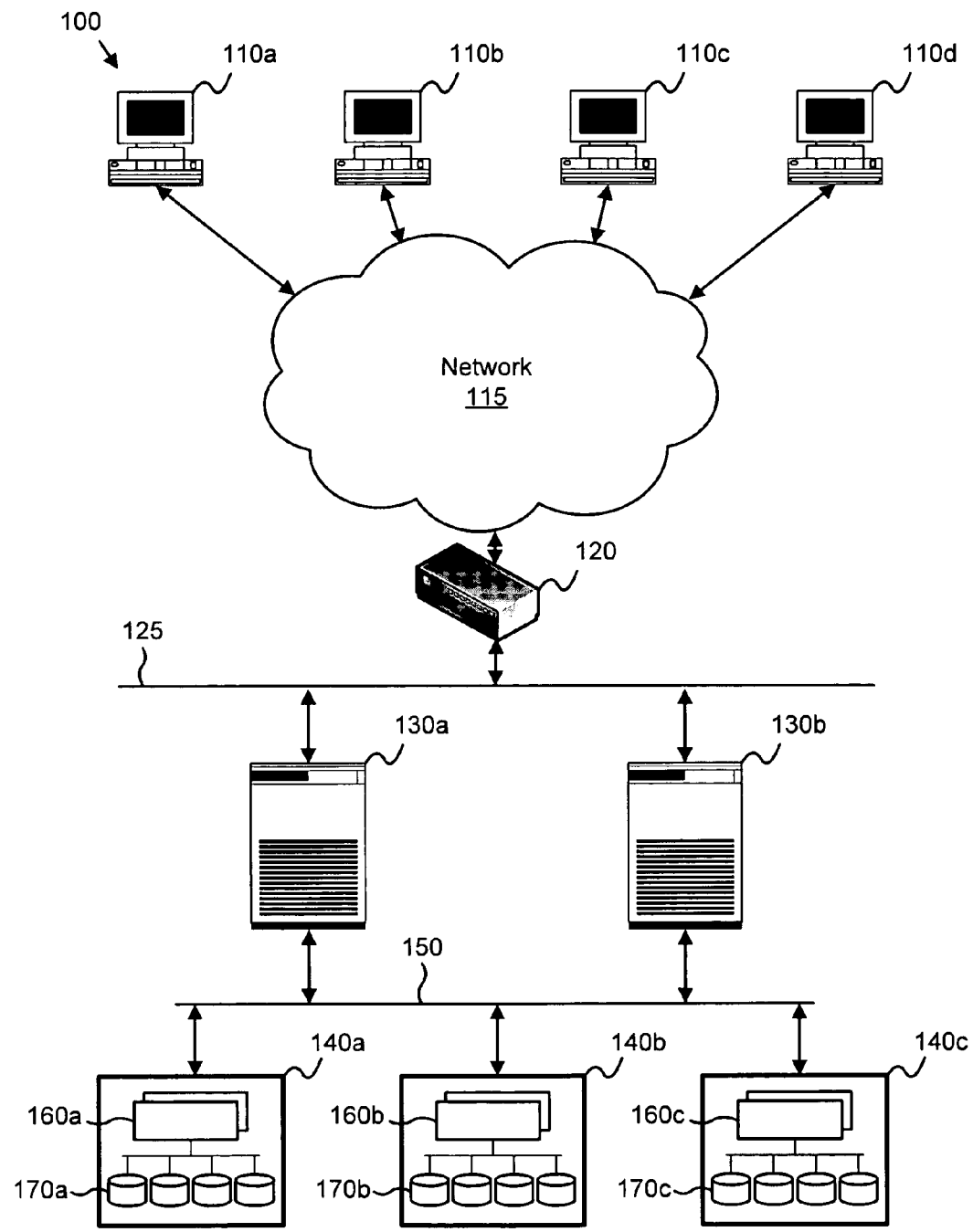
FIG. 1 is a schematic block diagram illustrating one embodiment of a data processing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data processing system 100 in accordance with the present invention. The system 100 includes one or more workstations 110, a network 115, a bridge 120, a local area network ("LAN") 125, one or more hub servers 130, a storage network 150, and one or more storage systems 140. In addition, each storage system 140 may include one or more storage controllers 160 and one or more storage devices 170.

The workstations 110 may be computer workstations, terminals, laptop computers, personal digital assistants, communication devices, or the like. The workstations 110 may communicate with the hub servers 130 through the network 115, the bridge 120, and the LAN 125 as is well known to those skilled in the art. Each hub server 130 may provide services for the workstations 110 and/or another hub server 130. The hub servers 130 may access the storage systems 140 through the storage network 150. In one embodiment, the storage network 150 and storage systems 140 are configured as a storage area network.

For example, the hub servers 130 may maintain one or more databases on the storage systems 140. The data of the databases may be stored on the storage devices 170 and be accessed using the storage controllers 160. In one embodiment, the hub servers 130 are WBI InterChange Servers produced by IBM of Armonk, N.Y. In addition, the hub servers 130 may execute the WBI Framework produced by IBM.

In a prophetic example, a first hub server 130a may maintain an inventory database on a first storage system 140. An accounting application may access the inventory database to, for example, determine a finished goods inventory. In one embodiment, the accounting application may execute on the first hub server 130a. Alternatively, the accounting application may execute on a second hub server 130b or on another connected server or computing system.

Continuing the prophetic example, the accounting application may be configured to interface directly with the first hub server 130a. Alternatively, the accounting application may not be configured to interface directly with the first hub server 130a. As a result, an interface is required to manage communications between the accounting application and the first hub server 130a. The interface may be created using a template. The embodiment of the present invention supports and facilitates modifying the template by incorporating customizing entries to template in subsequent template instances as will be described hereafter.

Figure 2:
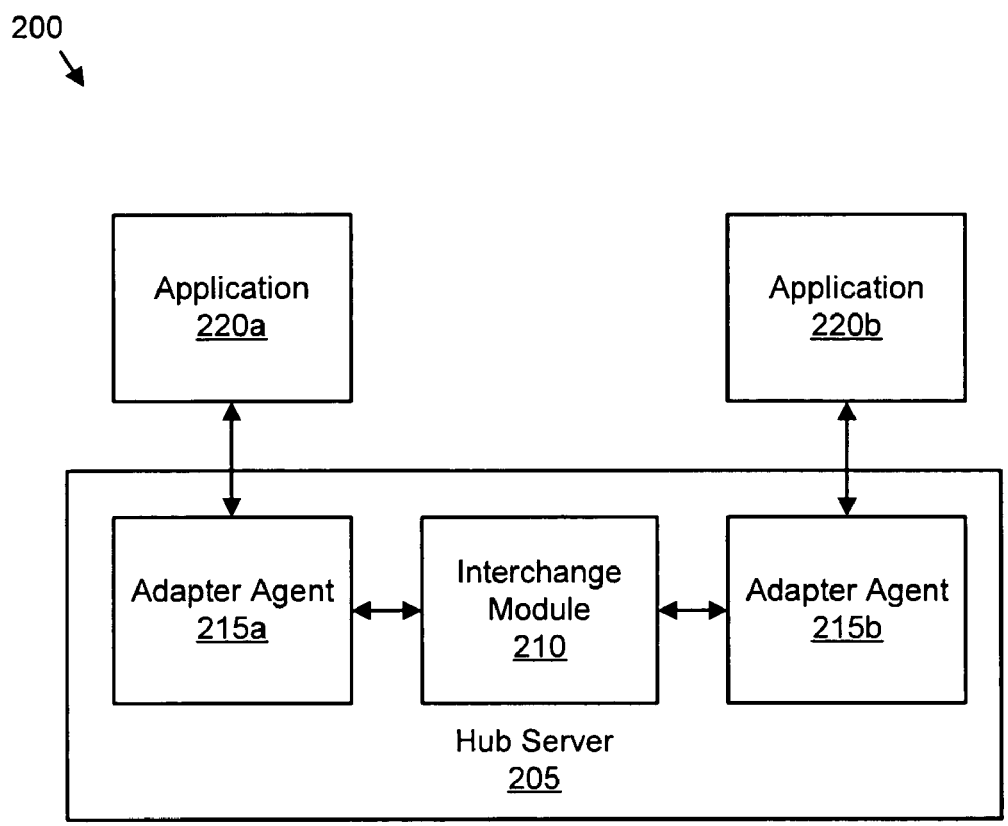
FIG. 2 is a schematic block diagram illustrating one embodiment of a hub server/application system of the present invention.

FIG. 2 is a schematic block diagram illustrating one embodiment of a hub server/application system 200 of the present invention. The system 200 includes a hub server 130 of FIG. 1 in communication with one or more applications 220. The description of the system 200 further refers to elements of FIG. 1, like numbers referring to like elements.

The hub server 130 is depicted executing an interchange module 210. In one embodiment, the interchange module 210 is the WBI Framework produced by IBM of Armonk, N.Y. The interchange module 210 may provide an application 220 with access to one or more databases stored on one or more storage systems 140. In addition, the interchange module interchange module 210 may allow an application 220 to manipulate data in the databases.

Each application 220 communicates with the interchange module 210 through an adapter agent 215. The application 220 includes one or more application objects. Each application object comprises data and/or functions. The data may be data for a single record such as a database row, a plurality of records such as a data base column, or the like. The functions may be a structured query language ("SQL") function, an arithmetic function, a statistical function, or the like. In a prophetic example, the application object includes customer registration data and a function that creates a customer account for a customer from the customer registration data.

The adapter agent 215 may employ an application program interface ("API") of the application 220 to communicate with the application 220. In a prophetic example, the application 220 may have a first API that provides an application object comprising an index value, index column name, a data column name, and an SQL SELECT function. In addition, the application 220 may have a second API that receives a value that corresponds to the index value, index column name, and data column name. Thus in a prophetic example, the application 220 may provide through the first API the index value '245456,' the column name 'Customer_ID,' the data column name 'Phone_num,' and SELECT function, and may receive the value '(750) 123-4567' through the second API in response to the first API.

The interchange module 210 may include one or more business objects. Each business object may include one or more data attributes. In one embodiment, the data attributes are referred to as attributes. A data attribute may be a database schema column name, a column name and index value, a view name, or the like. A business object may also include one or more functions. In one embodiment, the functions are referred to as verbs. In a prophetic example, a business object function may determine the mathematical mean of the values of a database schema column. In one embodiment, the business object may be configured as a flat object, with configured as a flat object, with one array of data values. Alternatively, the business object may be hierarchical, wherein a parent array of data values is linked to one or more child arrays of data.

The adapter agent 215 interfaces between the interchange module 210 and the application 220 by converting an application object of the application 220 into a business object of the interchange module 210 and by converting the business object into an application object. In one embodiment, an application API passes the application object to the adapter agent 215 and the adapter agent passes a business object converted from the application object to the interchange module 210. Similarly, the interchange module 210 may pass a business object to the adapter agent 215 and the adapter agent 215 may pass an application object converted from the business object to an API of the application 220.

Figure 3:
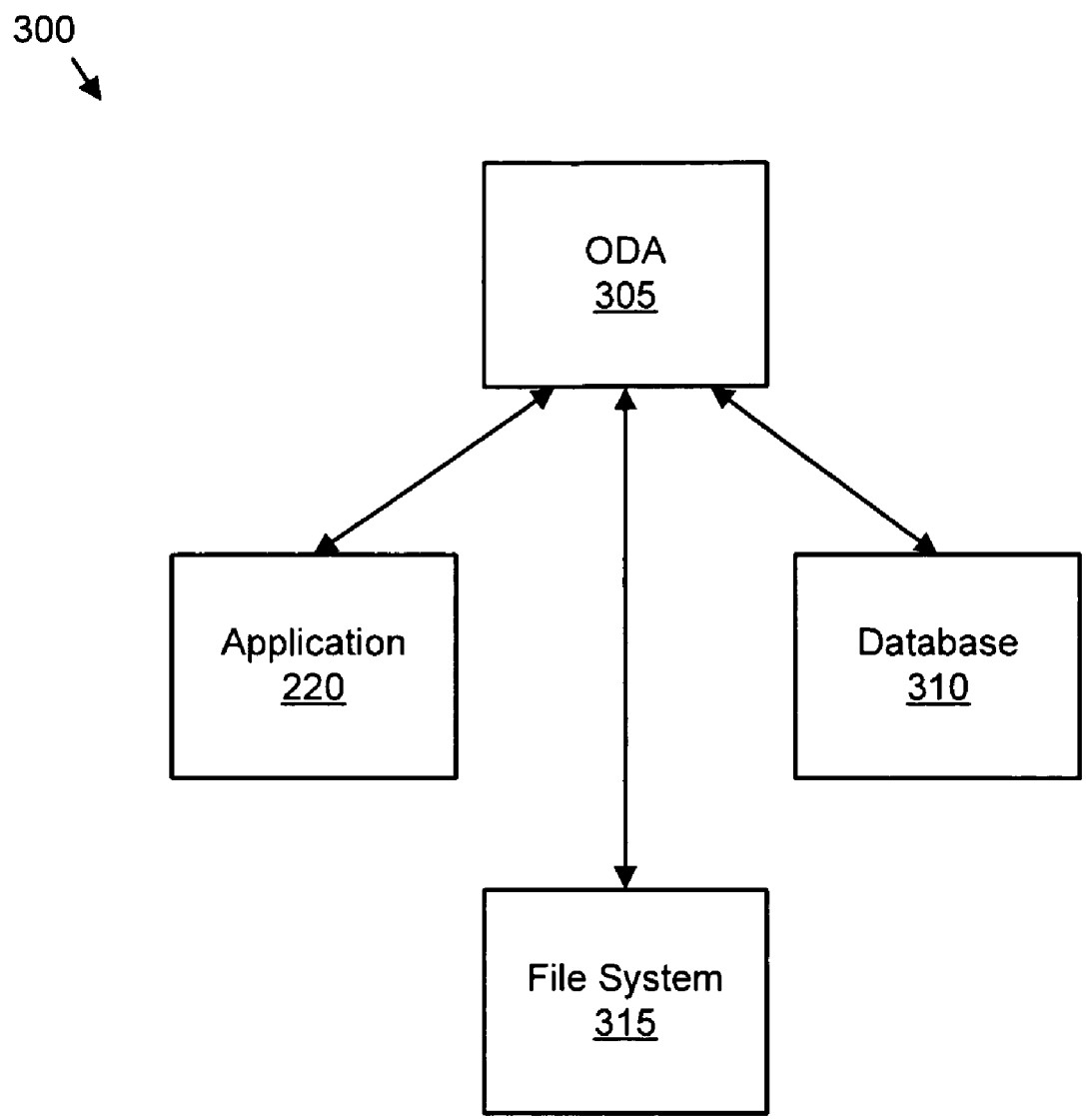
FIG. 3 is a schematic block diagram illustrating one embodiment of an ODA system of the present invention.

FIG. 3 is a schematic block diagram illustrating one embodiment of an ODA system 300 of the present invention. The system 300 includes an ODA 305, an application 220, a database 310, and a file system 315. In addition, the description of the system 300 refers to elements of FIGS. 1-2, like numbers referring to like elements.

The ODA 305 interacts with the application 220 and may interact with the database 310, and/or the file system 315 to specify a business object. The ODA 305 may interface to the application 220 and retrieves a list of data names, function names, and the like that are supported by the application 220. The ODA 305 may employ a name of the application 220, a user identifier of an account with access to the application 220, a password for the account, and the like to access the application 220. In addition, the ODA 305 may employ a table name, a schema name, a data value, or the like to retrieve the list of data names. Alternatively, the ODA 305 communicates with the application 200 using an API. In a prophetic example, the ODA 305 communicates the table name 'Customers' to the application 220 to receive a list of all column names associated with the 'Customers' table of the application 220.

In addition, the ODA 305 may communicate with a database 310 and/or a file system 315 to retrieve lists of data names and/or functions. In a prophetic example, the database 310 may reside on a storage system 140 of FIG. 1. The ODA 305 may communicate with the database 310 to receive a list of data names and/or functions of the database 310. In a certain embodiment, the ODA 305 communicates with the file system 315 to receive a list of files, data stores, data names, and the like.

In one embodiment, the ODA 305 specifies a business object by mapping one or more data names and functions of the application 220 with one or more data names and functions of the database 310 and/or file system 315. In a prophetic example, the ODA 305 may specify a business object comprising the application data name 'Phone' mapped to the database data name 'Phon_num' along with an application retrieve function mapped to a database SQL SELECT function.

Figure 4:
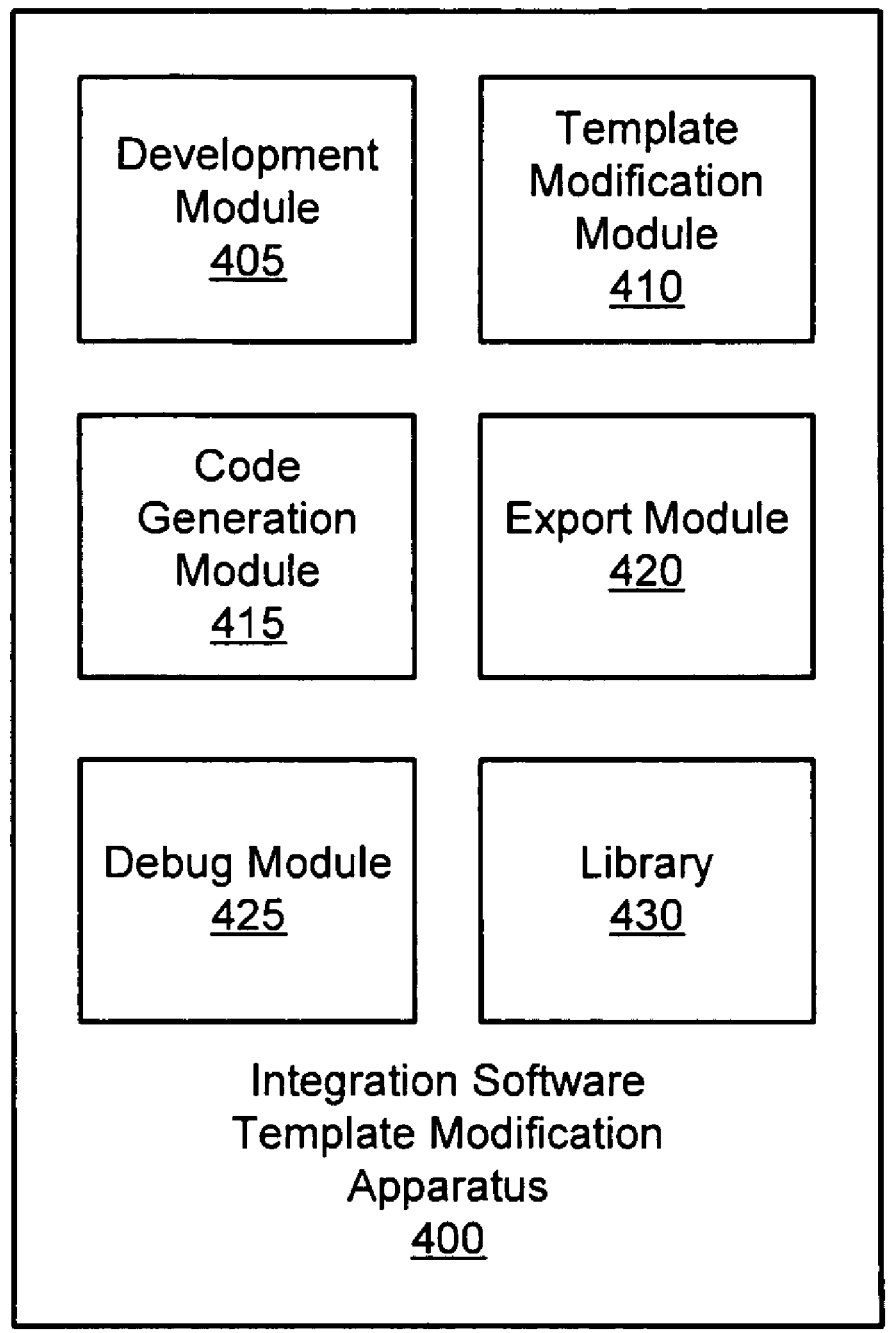
FIG. 4 is a schematic block diagram illustrating one embodiment of an integration software template modification apparatus of the present invention.

FIG. 4 is a schematic block diagram illustrating one embodiment of an integration software template modification apparatus 400 of the present invention. The apparatus 400 includes a development module 405, template modification module 410, code generation module 415, export module 420, debug module 425, and library 430. In addition, the description of the apparatus 400 refers to elements of FIGS. 1-3, like numbers referring to like elements.

The library 430 includes a first code set and a template. A developer may select the template from the library 430 for developing an adapter agent 215 and/or an ODA 305. In one embodiment, the first code set is an XML code set and the template is an XML form template. In a certain embodiment, the first XML code set generates the XML form template. The library 430 may include a plurality of code sets and templates. In one embodiment, the library 430 incorporates a revision management function.

In one embodiment, the template is an adapter template for generating an adapter agent 215 for interfacing between the hub server 205 and the application 220. In an alternate embodiment, the template is an ODA template for generating an ODA 305.

The development module 405 creates a project from the template and a developer input as will be described hereafter. The developer may provide the development module 405 with the developer input. For example, the developer input may be a selection and/or indication with a computer pointing device such as a mouse, a text entry, or the like that selects a configuration parameter.

The template modification module 410 modifies the template in response to the project as will be described hereafter. In one embodiment, the developer selects one or more developer inputs for use by the template modification module 410 in modifying the template. Alternatively, the template modification module 410 may automatically modify the template using each developer input.

The code generation module 415 generates a second code set from the modified template. In one embodiment, the second code set is an XML code set. The second code set may be employed by the template to receive developer inputs. Alternatively, the second code set may generate an updated template.

In one embodiment, the export module 420 exports the second code set to the library 430 as will be described hereafter. In addition, the export module 420 may build a run-time process such as an adapter agent 215 and/or ODA 305 from the second code set.

In one embodiment, the debug module 425 debugs the run-time process. In a prophetic example, the debug module 425 may record each operation performed by the run-time process, along with the values of processor registers, data values, and the like. The developer may display the recorded operations and values to find bugs that may be corrected using a development tool such as the development module 405. The apparatus 400 modifies the template by generating and employing the second code set, allowing a developer to retain and reuse configuration entries.

Figure 5:
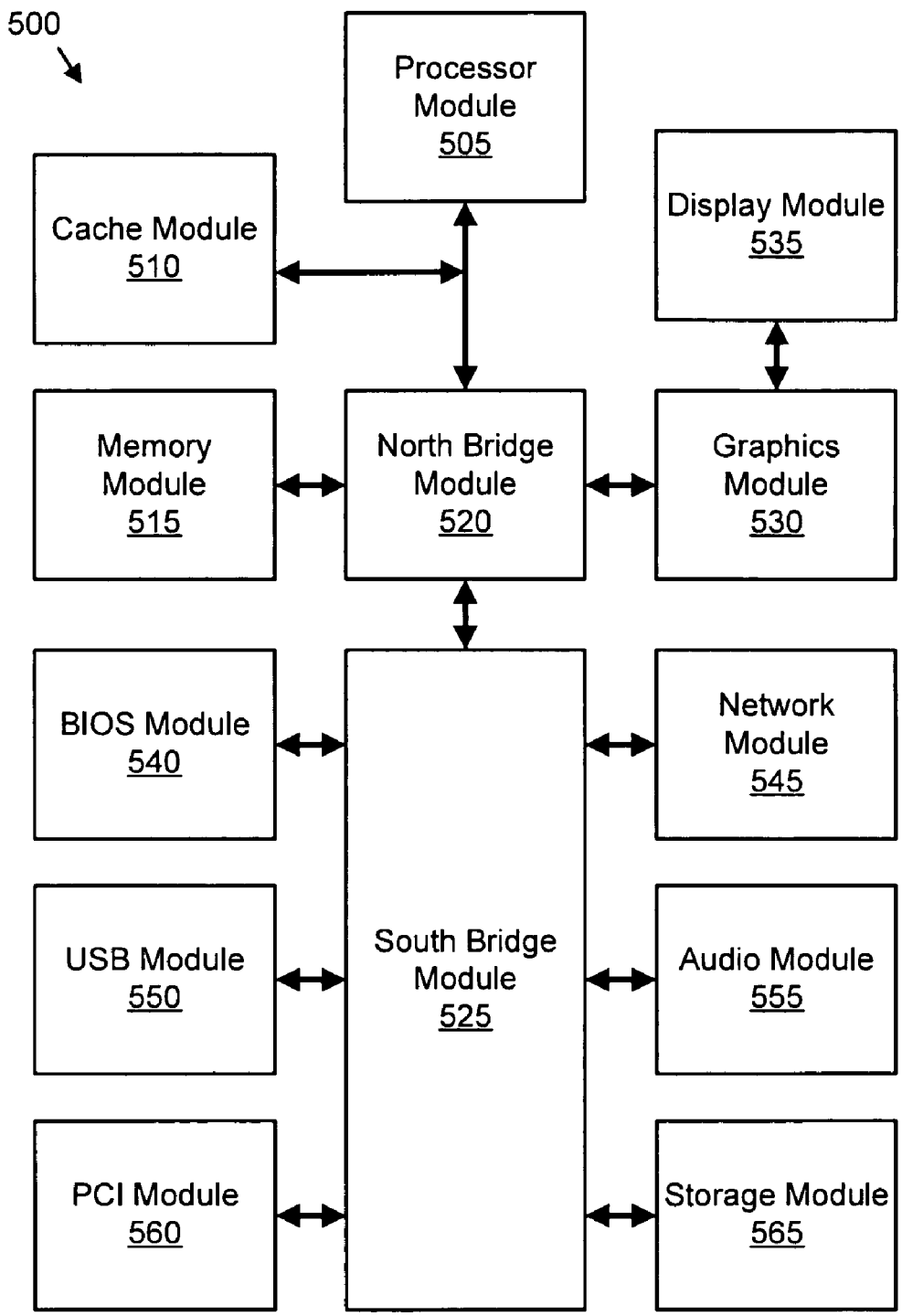
FIG. 5 is a schematic block diagram illustrating one embodiment of a computer in accordance with the present invention.

FIG. 5 is a schematic block diagram illustrating one embodiment of a computer 500 in accordance with the present invention. The computer 500 may be the workstation 110 and/or the hub server 130 of FIG. 1. As depicted, the computer 500 includes a processor includes a processor module 505, a cache module 510, a memory module 515, a north bridge module 520, a south bridge module 525, a graphics module 530, a display module 535, a basic input/output system ("BIOS") module 540, a network module 545, a universal serial bus ("USB") module 550, an audio module 555, a peripheral component interconnect ("PCI") module 560, and a storage module 565. In addition, the description of the computer 500 refers to elements of FIGS. 1-4, like numbers referring to like elements.

The processor module 505, cache module 510, memory module 515, north bridge module 520, south bridge module 525, graphics module 530, display module 535, BIOS module 540, network module 545, USB module 550, audio module 555, PCI module 560, and storage module 565, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 515 stores software instructions and data. The processor module 505 executes the software instructions and manipulates the data as is well know to those skilled in the art. In one embodiment the processor module 505 executes and the memory module 515 stores one or more software processes that embody the development module 405, template modification module 410, code generation module 415, export module 420, debug module 425, and library 430.

In one embodiment, the library 430 may reside on a plurality of storage locations in the memory module 515. The library 430 may organize templates and/or code sets as flat files, linked data arrays, or the like. The developer may view the template through display module 535. In addition, the developer may provide the developer input through a keyboard and/or mouse in communication with USB module 550.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
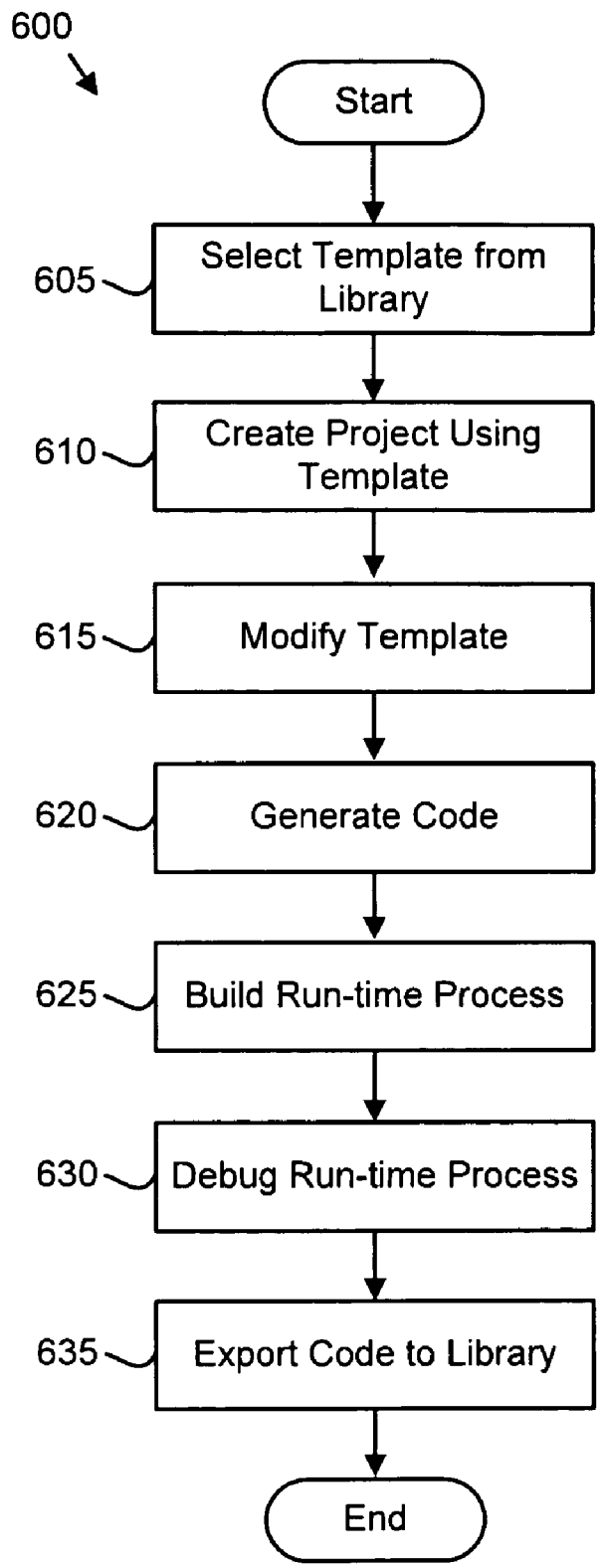
FIG. 6 is a schematic flow chart diagram illustrating one embodiment of an integration software template modification method of the present invention.

FIG. 6 is a schematic flow chart diagram illustrating one embodiment of an integration software template modification method 600 of the present invention. The method 600 substantially includes the steps to carry out the functions presented above with respect to the operation of the described systems 100, 200, 300 and apparatus 400, 500 of FIGS. 1-5. In addition, the description of the method 600 refers to elements of FIGS. 1-5, like numbers referring to like elements.

The method 600 begins, and in one embodiment, the developer selects 605 a template that employs a first code set from the library 430. The developer may employ the computer 500 to select 605 the template, and to perform the steps described hereafter. In one embodiment, the developer refers to a description to select the template. The description may be embedded in the template. Alternatively, the description may be recorded in a data store and indexed to the template.

The development module 405 creates 610 a project from a template using a developer input. The project may include one or more messages. In addition, the messages may be organized as a message file. The project may also include a process library. The process library may be an external process library such as a Java jar, a C++ library, or the like. The project may store one or more developer inputs with the selected template, message file, and process library.

The template modification module 410 modifies 615 the template in response to the project. In one embodiment, the template modification module 410 modifies 615 the template by incorporating the developer input into the template. In a prophetic example, the project includes the template and a text entry developer input to the template. The text entry developer input may for example specify an application 220 by name. The template modification module 410 may modify 615 the template by incorporating the text entry developer input within the template as will be explained in relation to FIGS. 8-10.

In an alternate embodiment, the template modification module 410 modifies 615 the template by making the developer input available as a selectable template option. Continuing the prophetic example, the template modification module 410 may modify 615 the template by making the text entry developer input a selectable option on a drop-down menu of the template.

The code generation module 415 generates 620 a second code set from the project. In one embodiment, the code generation module 415 generates 620 the second code set from the modified template of the project. In addition, the code generation module 415 may employ elements of the message file and/or process library. In a certain embodiment, the code generation module 415 incorporates the message file and the process library with the second code set. In a prophetic example, the code generation module 415 may store the message file and a link to the process library with the second code set.

In one embodiment, the export module 420 builds 625 a run-time process from the second code set. The run-time process may be an adapter agent 215. Alternatively, the run-time process may be an ODA 305. In one embodiment, the export module 425 creates source code from the second code set. The source code may be Java code, C++ code, or the like. The export module 425 may further build 625 the run-time process from the source code.

In one embodiment, the debug module 425 debugs 630 the run-time process. The debug module 425 may record the operations of the run-time process as the run-time process executes. The developer may configure the debug module 425 to trap on an operational event as is well known to those skilled in the art. In addition, the developer may view the operations occurring immediately before and after to operational event to find bugs in the project.

In one embodiment, the export module 420 exports 635 the second code set to the library 430. In a certain embodiment, the export module 420 associates a description with second code set. The description may be appended to the second code set. Alternatively, the description may be recorded in a data store and indexed to the second code set. The method 600 modifies 615 the template and preserves the developer input modifications for future projects.

Figure 7:
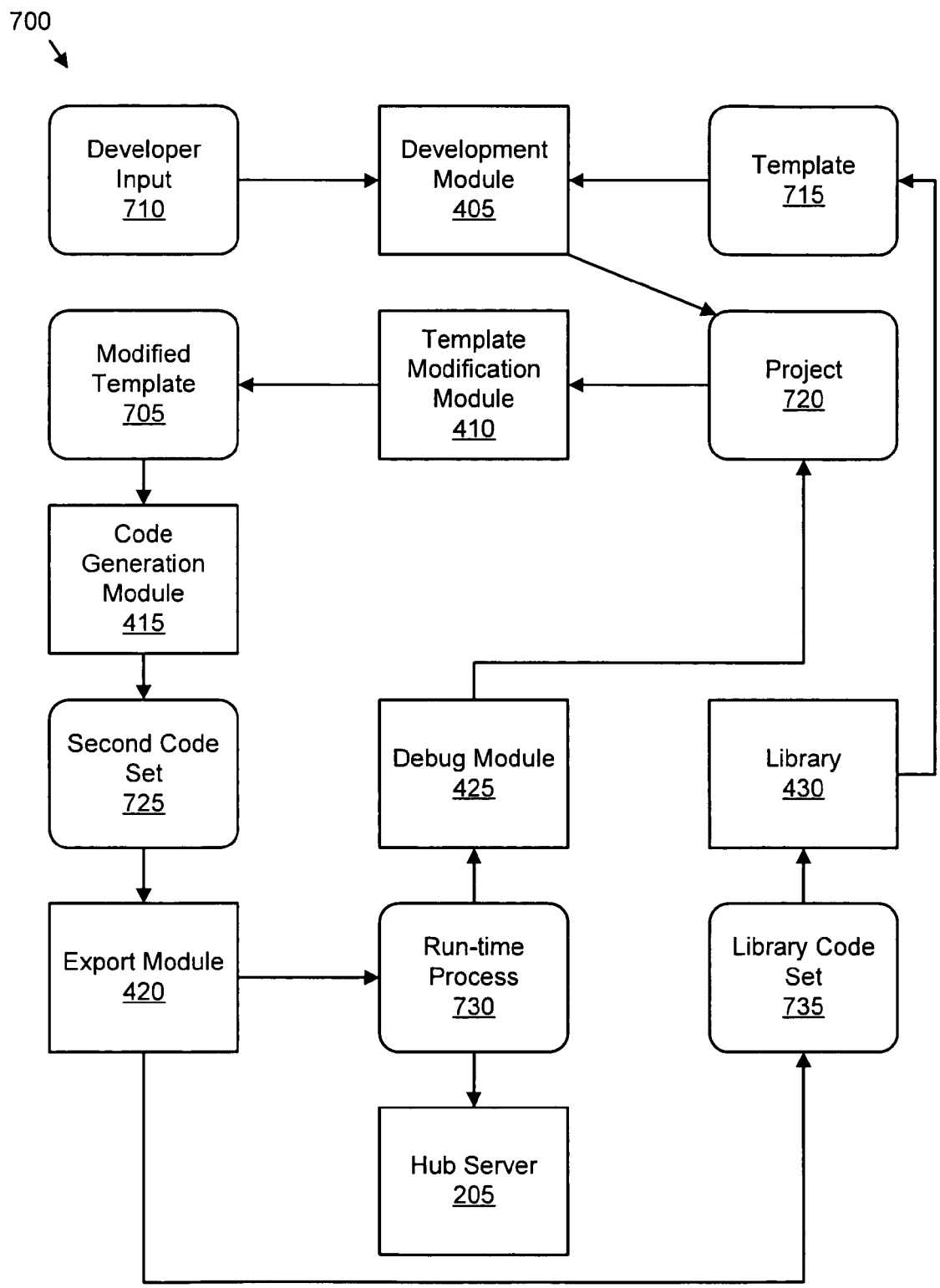
FIG. 7 is a schematic flow chart diagram illustrating one embodiment of a template modification process of the present invention.

FIG. 7 is a schematic flow chart diagram illustrating one embodiment of a template modification process 700 of the present invention. The process 700 shows the software elements that are employed and created by the development module 405, template modification module 410, code generation module 415, export module 420, debug module 425, and library 430 using the steps of the integration software template modification method 600 of FIG. 6. The description of the process 700 refers to elements of FIGS. 1-6, like numbers referring to like elements.

The development module 405 creates 610 a project 720 from a template 715 that is selected 605 from the library 430 and from one or more developer inputs 710. In one embodiment, the template 715 is an XML form. The XML form template 715 may be generated from a first XML code set as is well known to those skilled in the art.

The developer may enter the developer inputs in the template 715. In a prophetic example, the developer may enter the name of an application 220. In an alternate prophetic example, the developer may select a data column name as the developer input. Those skilled in the art recognize a variety of possible developer inputs.

The template modification module 410 modifies 615 the template 715 in response to the project 720 to form a modified template 705. In a prophetic example that will be shown in more detail hereafter in FIGS. 8-11, the template modification module 410 may modify 615 the template 715 by incorporating the developer input into the template 715 to create the modified template 705.

The code generation module 415 generates 620 a second code set 725 from the modified template 705. In one embodiment, the second code set 725 is an XML code set. Alternatively, the second code set 725 may be a Java code set, metadata, or the like. In a certain embodiment, code generation module 415 redacts the second code set 725 from the underlying XML code of the modified template 705.

In one embodiment, the export module 420 builds 625 a run-time process 730 from the second code set 725. The export module 420 may translate XML code of the second code set 725 into source code such as Java, C++, or the like. The export module 420 may further encapsulate the Java source code as a Java run-time process 730. Alternatively, the export module 420 may compile the C++ source code as a run-time executable process 730.

In one embodiment, the debug module 425 debugs 630 the run-time process 730. The developer may correct the project 720 with developer inputs to correct bugs found in the second code set 725. The hub server 205 may execute the run-time process 730 when the run-time process 730 is debugged.

In one embodiment, the export module 420 exports 635 the second code set 725 725 as a library code set 735 to the library 430. The export module 420 may format the library code set 735 for use by one or more templates 715. In a prophetic example, the template 715 may incorporate one or more XML code sets. The export module 420 may format the library code set 735 for incorporation with the template 715 as an XML code set by adding coded identifiers, commands, and the like to the second code set 735.

The library 430 may store the library code set 735 created from the second code set 725 in a hierarchical structure wherein the library code set 735 is indexed to the first code set. Alternatively, the library 430 may index and store the library code set 735 using a description created for the second code set 725. The developer may employ the library code set 735 to create another project 720 that includes and preserves the modifications that the developer made to the original project 720.

FIG. 8 is a text diagram illustrating one embodiment of a code set 800 of the present invention. The code set 800 may be a first code set as described previously. The description of the code set 800 refers to elements of FIGS. 1-7, like numbers referring to like elements. FIGS. 8-11 comprise a prophetic example of the template modification process 700 of FIG. 7.

The code set 800 is depicted as an XML code set. The code set 800 includes a plurality of XML statements 805. The statements 805 may comprise an XML form template 715. Included in the XML statements are two input statements 810 that receive data through input boxes on the template 715 as will be illustrated in FIG. 9A. In addition, the XML statements 805 include two parameter statements 815 that define data.

Figure 9A:
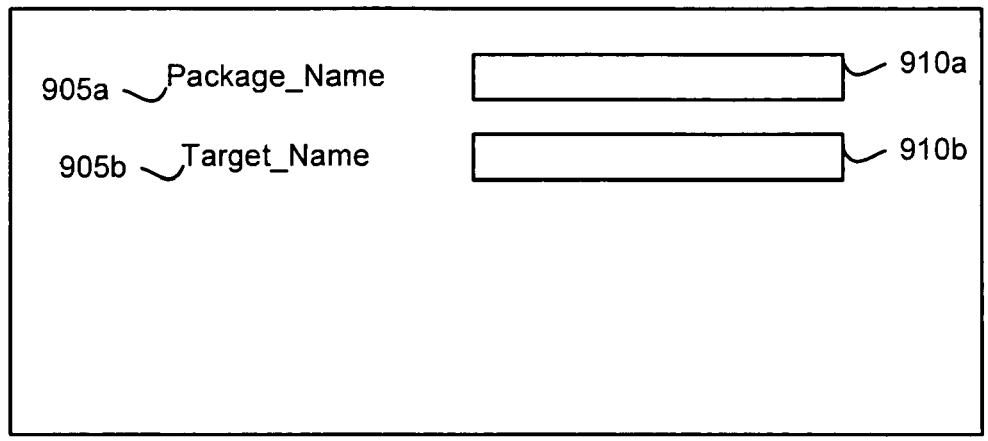
FIG. 9A is a drawing illustrating one embodiment of a template of the present invention.

FIG. 9A is a drawing illustrating one embodiment of a template 715 of the present invention. The template 715 is the template 715 of FIG. 7. The description of the template 715 refers to elements of FIGS. 1-8, like numbers referring to like elements.

The template 715 is depicted as generated from the code set 800 of FIG. 8. The template 715 is shown as the template 715 may be displayed for the developer on the display module 535 of FIG. 5. As depicted, the template 715 includes one or more input labels 905 labels 905 and one or more input boxes 910. A first input label 905a is created from a first input statement 805a. A second input label 905b is also created from a second input statement 805b. The template 715 includes a first input box 910a that is defined by the first input statement 805a and is configured to receive a first data value as defined by a first parameter statement 815a. In the prophetic example, the first data value is a package name. A second input box 910b is defined by the second input statement 805b and is configured to receive a second data value as defined by a second parameter statement 815b. In the prophetic example, the second data value is a target name.

Figure 9B:
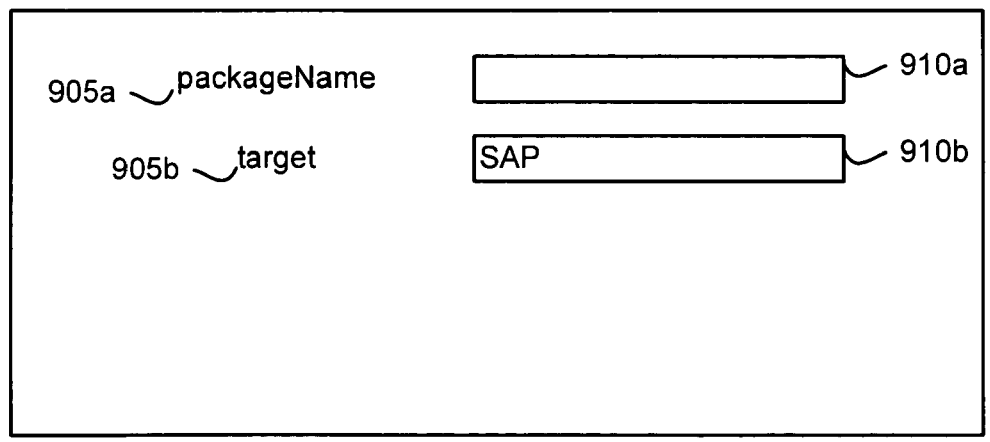
FIG. 9B is a drawing illustrating one embodiment of a template with developer input of the present invention.

FIG. 9B is a drawing illustrating one embodiment of a template 715 with developer input 710 of the present invention. The template 715 of FIG. 9A is depicted with a data value entered in the second input box 910b. In one embodiment, the template 715 is the modified template 705 of FIG. 7.

The developer may enter the data value as a configuration entry for the project 720. While the data value may be used to build 625 a run-time process 730, the embodiment of the present invention may also retain the data value as part of the template 715 of a subsequent project 720.

The template modification module 405 may modify 615 the template 715 with the developer input 710 to form a modified template 705. The modified template 705 may incorporate the developer input 710 in the second input box 910b.

FIG. 10 is a text diagram illustrating one embodiment of a modified code set 1000 of the present invention. The modified code set 1000 depicts a prophetic example of the code set 800 of FIG. 8 as generated 620 by the code generation module 415 from the template 715 of FIG. 9B. The description of the modified code 1000 also refers to elements of FIGS. 1-9B, like numbers referring to like elements. The modified code set 1000 may be the second code set 725 and/or library code 735 of FIG. 7.

The modified code set 1000 is depicted as an XML code set. The modified code set 1000 includes a plurality of XML statements 1005. The second input statement 810b of FIG. 8 is modified to a statement 1010 that specifies the data value as "SAP." Thus the developer need not specify the target name as the second data value for the target name is incorporated in the modified code set 1000.

Figure 11:
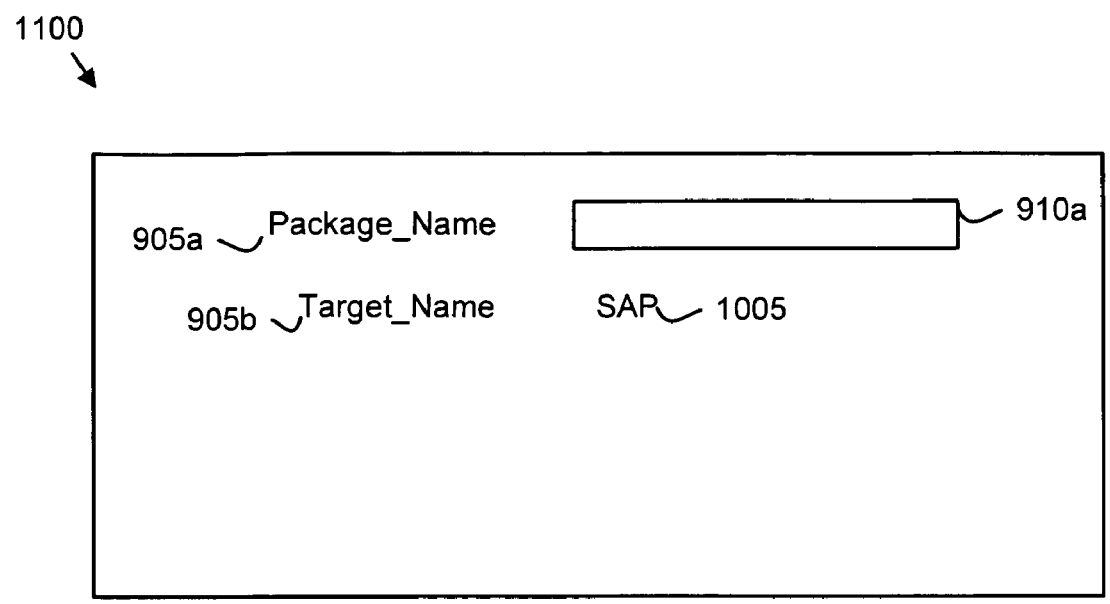
FIG. 11 is a drawing illustrating one embodiment of an updated template of the present invention.

FIG. 11 is a drawing illustrating one embodiment of an updated template 1100 of the present invention. The updated template 1100 is a prophetic example of the template 715 employing the modified code set 1000 of FIG. 10. The description of the updated template 1100 refers to elements of FIGS. 1-10, like numbers referring to like elements.

The updated template 1100 is depicted as generated from the modified code set 1000 of FIG. 10. The first input statement 810a creates the first input box 910a as with the template 715 of FIG. 9A. However, the second input box 910a of the template 715 of FIG. 9A is replaced with a displayed data value 1105 specifying that the target name is "SAP." Thus the developer may preserve configuration entries to a template 715 in the updated template 1100 for use with subsequent projects 720.

The embodiment of the present invention modifies a template 715. In addition, the embodiment of the present invention may export a second code set 725 that includes the template modifications to a library 430 to allow subsequent reuse of the modifications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to modify an integration software template, the apparatus comprising:
    a memory device storing executable code;
    a processor executing the executable code, the executable code comprising
        a library comprising a first code set and one or more templates comprising an object discovery agent (ODA) template for generating an ODA that discovers an application object associated with an application and an adapter agent template for interfacing between a hub server and the application by converting the application object into a business object;
        a development module creating a project using a first template of one of the ODA template and the adapter agent template, and a developer input;
        a template modification module modifying the first template in response to the project;
        a code generation module generating a second code set from the modified first template; and
        an export module translating the second code set into a source code set and exporting the second code set to the library, the second code set is indexed to the first code set for use with the ODA template and the adapter agent template to create a subsequent project.

2. The apparatus of claim 1, wherein generating the second code set comprises replacing an input prompt of the first code set with a specified parameter.

3. The apparatus of claim 1, wherein generating the second code set comprises replacing a first parameter of the first code set with a second parameter.

4. The apparatus of claim 1, wherein the first and second code sets are extensible markup language ("XML") code sets and the first template is configured as an XML form.

5. The apparatus of claim 1, wherein the hub server is an International Business Machines Corporation ("IBM") Websphere Business Integration ("WBI") InterChange Server.

6. The apparatus of claim 1, the export module further building the second code set as an adapter agent.

7. The apparatus of claim 1, wherein the first and second code sets are Java-based code sets.

8. The apparatus of claim 1, wherein the first and second code sets are C++-based code sets.

9. A computer program product comprising a memory device storing executable code executed by a processor, operations of the computer program product comprising:
    creating a project using a first template of one of an object discovery agent (ODA) template for generating an ODA that discovers an application object associated with an application and an adapter agent template for interfacing between a hub server and the application by converting the application object into a business object comprised in a library, and a developer input;
    modifying the first template in response to the project;
    generating a second code set from the modified first template;
    translating the second code set into a source code set; and
    exporting the second code set to the library, the second code set is indexed to the first code set for use with the ODA template and the adapter agent template to create a subsequent project.

10. The computer program product of claim 9, wherein generating the second code set comprises replacing an input prompt with a specified parameter.

11. The computer program product of claim 9, wherein generating the second code set comprises adding a first parameter to a list of a parameters.

12. The computer program product of claim 9, wherein the first and second code sets are XML code sets and the template is an XML form.

13. The computer program product of claim 9, the operations further comprising selecting the first template and first code set from the library.

14. The computer program product of claim 9, the operations further comprising building the second code set as an adapter agent.

15. The computer program product of claim 14, wherein the hub server is an IBM WBI InterChange Server.

16. The computer program product of claim 14, the operations further comprising debugging the adapter agent.

17. The computer program product of claim 16, wherein debugging the adapter agent comprises recording information from the adapter agent as the adapter agent executes on the hub server.

18. The computer program product of claim 9, the operations further comprising building the second code set as an ODA.

19. The computer program product of claim 9, wherein the first and second code sets are Java-based code sets.

20. The computer program product of claim 9, wherein the first and second code sets are C++-based code sets.

21. A system to modify an integration software template, the system comprising:
    a memory device storing executable code;
    a processor executing the executable code, the executable code comprising
        a library comprising a first XML code set and a first template of one of an object discovery agent (ODA) template for generating an ODA that discovers an application object associated with an application and an adapter agent template for interfacing between a hub server and the application by converting the application object into a business object;
        a development suite comprising
            a development module creating a project using the first template and a developer input;
            a template modification module modifying the first template in response to the project;
            a code generation module generating a second XML code set from the modified first template; and an export module translating the second XML code set into a source code set and exporting the second XML code set to the library, the second code set is indexed to the first XML code set for use with the ODA template and the adapter agent template to create a subsequent project.

22. The system of claim 21, wherein generating the second XML code set comprises replacing an input prompt of the first XML code set with a specified parameter.

23. The system of claim 21, wherein generating the second XML code set comprises replacing a first parameter of the first XML code set with a second parameter.

24. The system of claim 21, wherein the first and second templates are XML forms.

25. A method for modifying an integration software template, the method comprising:

receiving, by use of a processor, an integration software template modification input;

providing the integration software template modification input to a development tool suite;

the development suite comprising
a memory device storing executable code;
the processor executing the executable code, the executable code comprising
a library comprising a first XML code set and a first template of one of an object discovery agent (ODA) template for generating an ODA that discovers an application object associated with an application and an adapter agent template for interfacing between a hub server and the application by converting the application object into a business object;
a development module creating a project from the first template and a developer input;
a template modification module modifying the first template in response to the project and the integration software template modification input;
a code generation module generating a second XML code set from the modified first template;
an export module translating the second XML code set into a source code set and exporting the second XML code set to the library, the second XML code set indexed to the first XML code set for use with the ODA template and the adapter agent template to create a subsequent project; and providing the second XML code set to a customer.

26. The method of claim 25, wherein generating the second code set comprises replacing an input prompt of the first code set with a specified parameter.

27. The method of claim 25, wherein generating the second code set comprises replacing a first parameter of the first code set with a second parameter.

28. The method of claim 25, wherein generating the second code set comprises adding a first parameter to a list of a parameters.

29. The method of claim 25, wherein the hub server is an International Business Machines Corporation ("IBM") Websphere Business Integration ("WBI") InterChange Server.

30. The method of claim 25, the export module further building the second code set as an adapter agent.

31. The method of claim 25, the export module further building the second code set as an ODA.

32. An apparatus to modify an integration software template, the apparatus comprising:

a memory device storing executable code;
a processor executing the executable code, the executable code comprising
means for selecting a first template from one of an object discovery agent (ODA) template for generating an ODA that discovers an application object associated with an application and an adapter agent template for interfacing between a hub server and the application by converting the application object into a business object comprised in a library;
means for creating a project using the first template and a developer input;
means for modifying the first template in response to the project;
means for generating a second XML code set from the modified first template;
means for translating the second XML code set into a source code set;
means for exporting the second XML code set to the library, the second XML code set is indexed to the first code set for use with the ODA template and the adapter agent template to create a subsequent project; and
means for building the second XML code set as an adapter agent for interfacing the hub server and the application.

* * * * *